(No Model.)

D. L. CROFT.
BAND TIGHTENER.

No. 535,814. Patented Mar. 19, 1895.

Witnesses
Arthur Ashley
C. B. Bull.

David L. Croft,
Inventor
by Dodge & Sons
Attorneys.

UNITED STATES PATENT OFFICE.

DAVID L. CROFT, OF SPRINGFIELD, OHIO.

BAND-TIGHTENER.

SPECIFICATION forming part of Letters Patent No. 535,814, dated March 19, 1895.

Application filed August 27, 1894. Serial No. 521,430. (No model.)

*To all whom it may concern:*

Be it known that I, DAVID L. CROFT, a citizen of the United States, residing at Springfield, in the county of Clark and State of Ohio, have invented certain new and useful Improvements in Band-Tighteners, of which the following is a specification.

My invention relates to devices for stretching or tightening machine belts, and is designed as an improvement upon that shown in Letters Patent No. 201,596, granted to me March 26, 1878.

Figure 1:
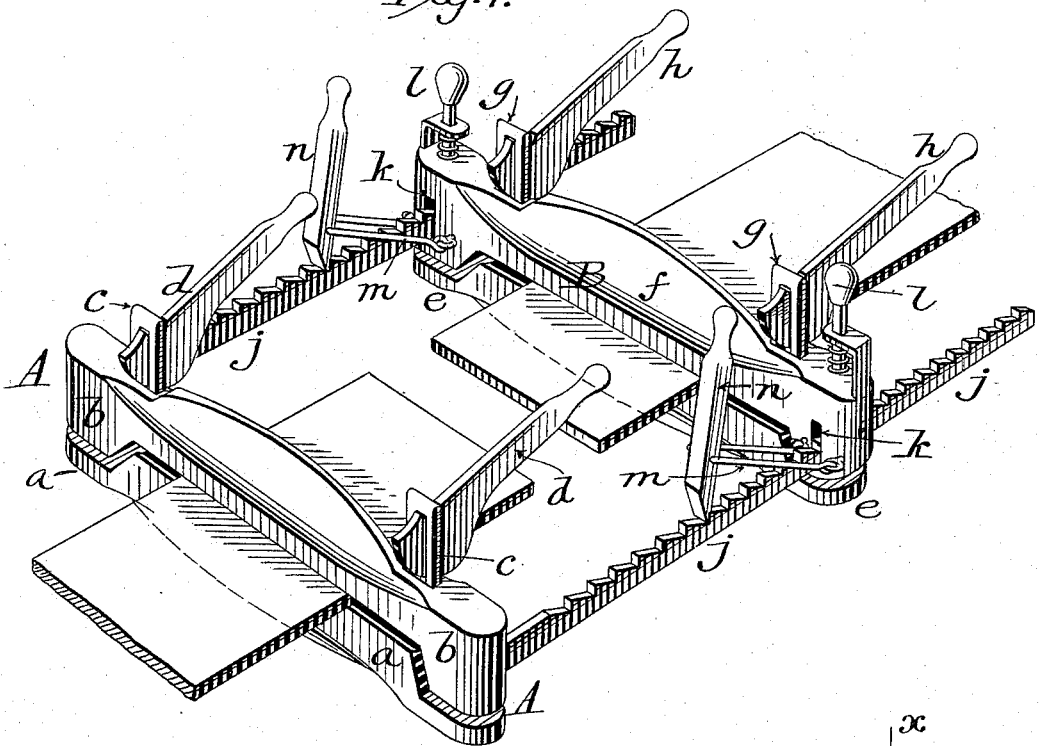
Figure 2:
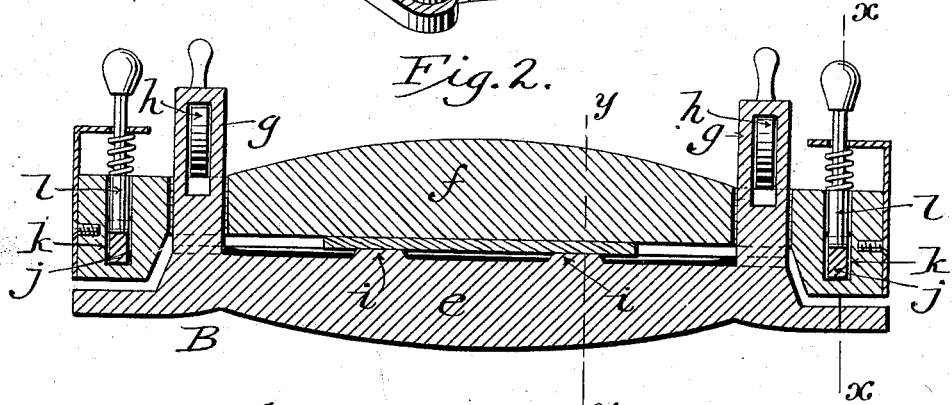
Figures 3, 4:
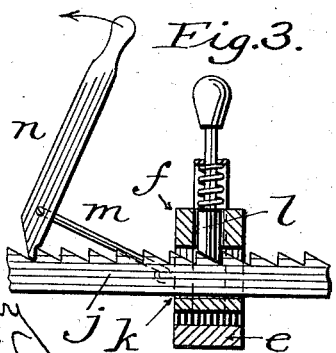

In the drawings: Figure 1 is a perspective view of my improved tightener; Fig. 2, a longitudinal sectional view through the movable clamp; Fig. 3, a transverse sectional view on the line $x$—$x$ of Fig. 2; and Fig. 4, a similar view on the line $y$—$y$.

The ends of the belt or band are held by means of two clamps A and B, which for convenience will be termed, respectively, the fixed and the movable clamps.

Clamp A comprises a lower bar $a$, and upper bar $b$,—the former being provided near its ends with slotted lugs $c$ which pass up through suitable holes formed in bar $b;$ and through the lugs $c$ are passed the eccentric levers $d$. By pressing down upon these levers, (which bear on their lower faces upon bar $b$, and at their upper edges or faces against the end wall of the slots in the lugs $c$) the two bars, $a$ and $b$, will be forced together and will firmly clamp and hold the belt or band. Clamp B, which also comprises two bars $e$ and $f$, is provided with similar lugs $g$ and levers $h$ which operate in the same manner to clamp the opposite end of the band or belt.

In order to prevent the clamps from slipping upon the bands, as happened in the prior construction, the face of one bar is made convex while the opposing face of the other bar is made concave, and provided with lugs or projections $i$, which as shown in Figs. 2 and 4 will indent themselves in the band and prevent slipping. The curved clamping surfaces also materially assist in preventing slipping.

Secured to bar $b$ of the fixed clamp A, are two rack bars $j\ j$ which pass through suitable holes or openings $k$ formed in the ends of the upper bar $f$ of the movable clamp; said rack bar being engaged by the spring-pressed pawls $l$, carried by bar $f$, so as to hold the clamps A and B in proper relative positions when it is desired to unite the ends of the band or belt.

Secured to the ends of bar $f$, on that face next to the clamp A, are the hinged or pivoted arms $m$, preferably in the form of yokes,— to which are pivoted the levers $n;$ the said levers being designed to engage the teeth of the rack bars $j\ j$, as shown in Figs. 1 and 3.

The operation is as follows: One end of the band is inserted between the bars $a\ b$ of clamp A, where it is firmly clamped by pressing down upon the eccentrics $d;$ while the other end of the band is inserted between the bars $e\ f$ of clamp B and firmly clamped by means of the eccentrics $h$. Clamp B is now passed onto the ends of the rack bars $j\ j$,— whose teeth are beveled or inclined to allow the pawls $l$ to ride freely thereover,—and the said clamp moved by hand toward the clamp A until the band becomes somewhat taut. After thus stretching the band by hand the pawls $l$ are allowed to drop into engagement with the rack bars and thereby hold the two clamps in their adjusted positions. To further stretch the band, the levers $n$ are brought into engagement with the teeth of the rack bars $j$, and then swung over in the direction of the arrow in Fig. 3, and in thus swinging, the levers, acting through the yokes $m$, draw the movable clamp B (with the attached band) farther upon the bars $j\ j$ and toward the fixed clamp. The pawls $l$ ride over the teeth of the rack bar when clamp B is being moved toward clamp A, but when the levers are disengaged from the rack bars preparatory to taking a new hold thereon, the pawls prevent the movable clamp B from moving outward upon the arms.

What I claim is—

1. In a band tightener, the combination with the fixed clamp A comprising two bars $a$ and $b$ and means for clamping the band therebetween; of rack bars $j\ j$ secured permanently to the bar $b;$ the movable clamp B comprising two bars $e$ and $f$ and means for clamping the band therebetween,—the said bar $f$ being provided with holes $k$ to receive the rack bars; the pawls $l$ carried by bar $f$ in position to engage the rack bars where they pass through said bar $f$; and levers carried by the clamp B to engage the rack bars and move the clamp B toward the clamp A.

2. In a band tightener, clamp A, comprising a bar $b$ provided with holes near its ends; bar $a$ provided with lugs $c$ slotted as at their upper ends and adapted to pass through the holes in bar $b$; and the detachable eccentric levers $d$ passing through the lugs.

3. In a band tightener, the combination with the clamp A provided with the rack bars $j\ j$; of the clamp B provided with holes or openings $k$ to receive the rack bars, and with pawls $l$ to engage the latter; and levers $n$ connected with the clamp B by means of the bail $m$.

In witness whereof I hereunto set my hand in the presence of two witnesses.

DAVID L. CROFT.

Witnesses:
A. H. NESBITT,
H. S. SHOWERS.